United States Patent [19]
Cane

[11] 3,775,744
[45] Nov. 27, 1973

[54] TRAFFIC CONTROLLER WITH BINARY COUNTER

[75] Inventor: Philip Cane, Brooklyn, N.Y.

[73] Assignee: The Marblelite Company, Inc., Brooklyn, N.Y.

[22] Filed: Mar. 29, 1971

[21] Appl. No.: 128,883

Related U.S. Application Data

[62] Division of Ser. No. 702,012, Jan. 31, 1968, Pat. No. 3,594,720.

[52] U.S. Cl. .......................... 340/44, 328/48, 340/41
[51] Int. Cl. .......................... G08g 1/09
[58] Field of Search .......................... 340/35, 36, 41, 44; 328/41, 42, 45, 46, 48, 49; 307/220, 226, 110

[56] References Cited

UNITED STATES PATENTS

| | | | |
|---|---|---|---|
| 3,286,230 | 11/1966 | Bolton | 340/36 |
| 3,594,720 | 7/1971 | Cane | 340/44 |
| 3,503,041 | 3/1970 | Duvivier | 340/44 |
| 3,281,782 | 10/1966 | Frielinghaus | 340/44 |
| 3,267,424 | 8/1966 | Brockett et al. | 340/44 |

*Primary Examiner*—Kathleen H. Claffy
*Assistant Examiner*—Randall P. Myers
*Attorney*—Wolf, Greenfield & Sacks

[57] ABSTRACT

A controller for traffic lights employing solid state components and providing both vehicular and pedestrian control. Cross street controls initiate operation of a binary counter sequentially to operate signal lights through predetermined time intervals. Interconnecting circuits provide for coordination with other signal lights, vehicle extension intervals, recall and resetting controls. An auxiliary memory circuit operates to distinguish between vehicle only and pedestrian operation.

6 Claims, 6 Drawing Figures

INVENTOR
PHILIP CANE
BY Wolf, Greenfield & Sacks
ATTORNEYS

INVENTOR
PHILIP CANE
BY
Wolf, Greenfield & Sacks
ATTORNEY

INVENTOR
PHILIP CANE
BY
Wolf, Greenfield & Sacks
ATTORNEY

INVENTOR
PHILIP CANE
BY *Wolf, Greenfield & Sacks*
ATTORNEY

INVENTOR
PHILIP CANE
BY
Wolf, Greenfield & Sacks
ATTORNEYS

| | INTERVALS | SIGNAL INDICATIONS | | | | COUNTER AND CODE GATING | | | | | PED. MEMORY AUXILIARY |
|---|---|---|---|---|---|---|---|---|---|---|---|
| | | | | | | | $FF_1$ | $FF_2$ | $FF_3$ | $FF_4$ | |
| PHASE "A" | MINIMUM | $G_1$ | $WK_1$ | $R_2$ | $DWK_2$ | | 0 | 0 | 0 | 0 | |
| | REST | $G_1$ | $WK_1$ | $R_2$ | $DWK_2$ | | 1 | 0 | 0 | 0 | |
| | PEDESTRIAN CLEARANCE | $G_1$ | FLDWK | $R_2$ | $DWK_2$ | | 0 | 1 | 0 | 0 | |
| | YELLOW | $Y_1$ | $DWK_1$ | $R_2$ | $DWK_2$ | | 1 | 1 | 0 | 0 | |
| | ALL RED | $R_1$ | $DWK_1$ | $R_2$ | $DWK_2$ | | 0 | 0 | 1 | 0 | |
| PHASE "B" VEH. ONLY | INITIAL I | $R_1$ | DWK | $G_2$ | $DWK_2$ | | 0 | 0 | 0 | 1 | 0 |
| | INITIAL II | $R_1$ | $DWK_1$ | $G_2$ | $DWK_2$ | | 0 | 0 | 0 | 1 | 0 |
| | EXTENSION | $R_1$ | $DWK_1$ | $G_2$ | $DWK_2$ | | 0 | 0 | 0 | 1 | |
| | YELLOW | $R_1$ | $DWK_1$ | $Y_2$ | $DWK_2$ | | 1 | 1 | 0 | 1 | |
| | ALL RED | $R_1$ | $DWK_1$ | $R_2$ | $DWK_2$ | | 0 | 0 | 1 | 1 | |

OR

| | | | | | | | | | | | |
|---|---|---|---|---|---|---|---|---|---|---|---|
| PHASE PED. ONLY OR VEH & PED. | WALK | $R_1$ | DWK | $G_2$ | $WK_2$ | | 0 | 0 | 0 | 1 | 1 |
| | PEDESTRIAN CLEARANCE | $R_1$ | $DWK_1$ | $G_2$ | $FLDWK_2$ | | 1 | 0 | 0 | 1 | 1 |
| | EXTENSION | $R_1$ | $DWK_1$ | $G_2$ | $DWK_2$ | | 0 | 1 | 0 | 1 | |
| | YELLOW | $R_1$ | $DWK_1$ | $Y_2$ | $DWK_2$ | | 1 | 1 | 0 | 1 | |
| | ALL RED | $R_1$ | $DWK_1$ | $R_2$ | $DWK_2$ | | 0 | 0 | 1 | 1 | |

LEGEND $G_1$, $Y_1$, $R_1$ — PHASE "A" GREEN, YELLOW, RED SIGNALS RESPECTIVELY.

$G_2$, $Y_2$, $R_2$ — PHASE "B" GREEN, YELLOW, RED SIGNALS RESPECTIVELY.

$WK_1$, $FLDWK_1$, $DWK_1$ — PHASE "A" WALK, FLASHING DONT WALK, DONT WALK RESPECTIVELY.

$WK_2$, $FLDWK_2$, $DWK_2$ — PHASE "B" WALK, FLASHING DONT WALK, DONT WALK RESPECTIVELY.

FIG. 3

INVENTOR
PHILIP CANE
BY Wolf, Greenfield + Sacks
ATTORNEY

TRAFFIC CONTROLLER WITH BINARY COUNTER

RELATED APPLICATION

This application is a division of application Ser. No. 702,012, filed Jan. 31, 1968, and issued as U.S. Pat. No. 3,594,720 on July 20, 1971.

This invention relates to traffic control signal systems and more particularly to controllers actuated by vehicles and/or pedestrians.

When a cross street intersects a main street, it is desirable to arrange the controller so that the main street lights will stay green until a vehicle approaches on a cross street and thereupon to actuate the cross street lights to green, the main street lights turning to red.

Also, when pedestrians approach, it is desirable to be able to change the lights so that the main street can be crossed.

Prior devices have not been completely satisfactory, particularly those where complicated mechanical movements are involved. It is desirable to be able to use solid state actuated arrangements in a simplified manner for the actuation and control of traffic signals. Also, it is necessary in a traffic control system to have dependability along with simplicity.

One of the objects of the invention is to use standard, readily available electronic components which are mass-produced and which may be readily applied to the present invention.

Another of the objects of the invention is to provide a traffic control system which is relatively simple and dependable.

Hereafter, the main street will be referred to as "phase A," sometimes referred to as "1," and the cross street as "phase B," sometimes referred to as "2." The controller is arranged to provide intervals in which there will be a phase A minimum period, a phase A rest period, a phase A pedestrian clearance period, a phase A yellow period, and an all-red period which can be identified as a phase A "all-red." The latter means that the signals are red in all directions.

In the operation of the phase B portion, there will be a phase B initial period which is broken into two subdivisions known as "Initial I" and "Initial II." There will also be a phase B extension, a phase B yellow, and a phase B "all-red" period. "Extension," in the art, means that the green period is flexible in length and may be preset within certain limits, but the actual green time is controlled in some manner by the passage of vehicles. "Recall," in the art, means the automatic return to the phase A green in spite of the fact that additional vehicles are present on the cross street.

To accommodate pedestrian traffic, there can be interposed a "Walk" period, phase B "Initial I," followed by a pedestrian clearance period, phase B "Initial II," such being activated by pedestrian control buttons. When actuated by vehicles only, B "Initial I" and "Initial II" go into two successive intervals of green and "Don't Walk."

These and other objects, advantages and features of the invention will become apparent from the following description and accompanying drawings which are merely exemplary.

In the drawings:

FIG. 3 is a tabulation showing the relationship between the controller intervals, the signal indications and the outputs of the controller counter.

Figure 1:
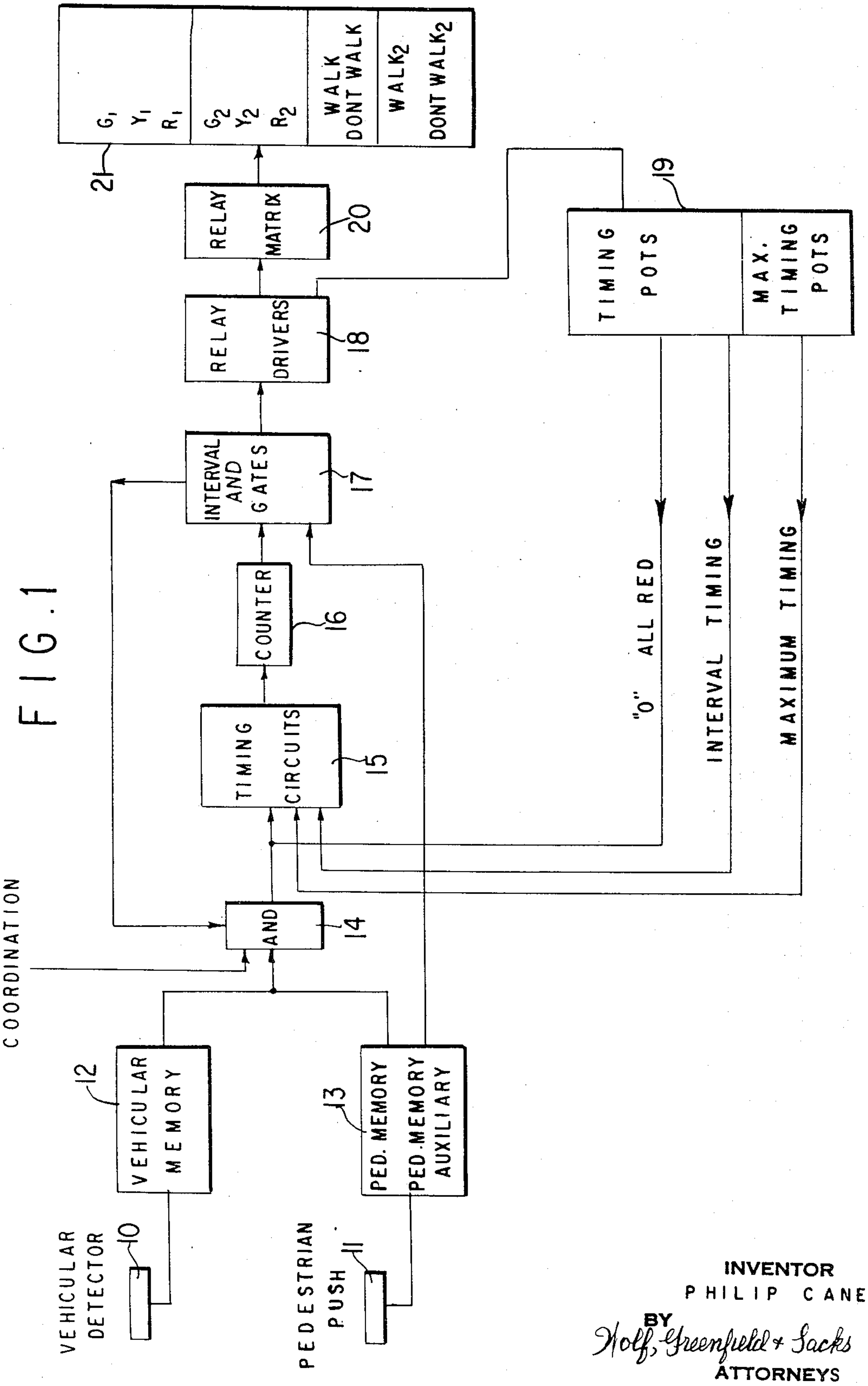
FIG. 1 shows a block diagram of one form of the invention.

Referring now to the block diagram of FIG. 1, phase A of the main street light is normally green and the counter at "A" rest position, having passed through a green minimum period. When a vehicle approaches a cross street, however,it will operate a vehicle detector indicated generally by the box 10 and cause operation of a vehicle memory circuit indicated by box 12. In like manner, if a pedestrian desires to cross the main street, a pedestrian control push button indicated by box 11 is provided and operates a pedestrian memory circuit indicated by the box 13. The output of the vehicle memory of the pedestrian memory circuits is fed to an "and" circuit indicated by box 14. If other circuit conditions are right, this will cause a stepping voltage or signal to the timing circuits indicated generally by the box 15. These circuits are also fed by an interval timing input and a maximum timing input fed from the timing potentiometers of box 19.

The timing circuits provide a trigger voltage which functions to position an electronic counter, which in the illustrated embodiment is a binary type counter indicated by box 16. It is to be understood that other types of counters can be used. Counter 16 may be a four-stage binary counter which has been designed to operate through a total of ten positions. The outputs of the binary counter are fed to interval gate circuits denoted generally by box 17. The interval gates of box 17 are also provided with a signal derived from the pedestrian memory circuit for a purpose hereinafter to be described. The outputs of the gate circuits control relay drivers, box 18, which operate a relay matrix illustrated by box 20. The relay matrix, in turn, controls sequencing of the signal lights schematically shown in box 21. The relay matrix of box 20 may be solid-state devices or may be electromechanical devices of various types. An output from the relay drivers 18 also feeds the timing potentiometers of box 19. Outputs from the timing potentiometers are fed back to the timing circuits included in box 15 and cooperate with the timing circuits to provide for controllable, variable, individual timing of each of the circuits needed for control purposes.

The overall operation of the control device will be best understood by reference again to the block diagram of FIG. 1. The controller is essentially a sequential device in which sets of traffic lights, box 21, are displayed for controllable intervals of time. The relay matrix, box 20, controls the power circuits for the lights of box 21. The relay matrix, in this case of a solid state type, is driven by the relay drivers, box 18, which are essentially solid state amplifying devices to bring the signal level up to a sufficient value to operate the relay devices in the matrix 20.

The relay drivers which control the relay matrix are, in turn, controlled by the solid state interval gate devices or circuits of box 17. The interval gates control the relay drivers so that, in spite of the many intervals which are necessary for proper operation of the controller, the motorist and pedestrian see only the light sequence, not the subdivisions of the light sequence. Thus, for example, there may be several intervals during which Green-1 is displayed. This is taken up more completely in terms of signal indications and interval relationships in FIG. 3.

The interval gates provide a solid state static mechanism whereby the outputs from the binary counter, box 16, are translated by means of typical "and" gates into specific and discrete interval signals. The interval gates are also controlled by the pedestrian auxiliary memory circuit. This circuit, in conjunction with the counter output, determines specifically whether the controller will operate to provide phase B initial intervals I and II for a vehicle call only, or the pedestrian intervals (Initial I) Walk and (Initial II) Pedestrian Clearance which are provided in the event of a pedestrian call with or without a vehicle call.

The counter is a binary electronic counter which changes condition at the reception of a pulse, that is, each pulse changes the counter into its next stage, and returns it to a first position at the pulse that takes place in the last position. The count pulse is derived from the output of timing circuits. This pulse is not repetitive but comes at a time that is determined by means of the timing potentiometers of box 19. That is, the space between pulses is variable to a large extent and is predetermined by controls which are preset by the consumer, in this case, the traffic engineer or his deputy.

While the controller has been referred to as sequential, it is not totally sequential but depends upon the nature of the traffic flow. For example, if there is no traffic flow in the secondary street and if there are no pedestrians who wish to cross the main street, then the controller output, namely, the counter 16, the interval gates 17, the relay drivers 18 and the relay matrix 20, will react to provide signal lights 21 which indicate "Green-1" or right-of-way for the main street, and "Red-2" which is stop for the cross street. At the same time, "Walk-1" on the main street light will indicate that it is safe for pedestrians to cross the cross street while "Don't Walk-2" warns against crossing the main street. These signals will remain until such time as there is some kind of vehicular or pedestrian need to change the condition. In this event, either the vehicle detector of box 10 or the pedestrian pushbutton of box 11 may be utilized to operate the vehicle memory circuit 12 and/or the pedestrian memory circuits 13. This circuitry, other conditions being satisfactory, starts the counter of box 16 from its "Rest" position so that a sequence such as shown on FIG. 3 is possible.

Ordinarily, the counter remains in the "Rest" position with the signal indications as shown in FIG. 3. This counter can be started, however, by signals from the vehicle and/or the pedestrian memory circuits which are fed to the "and" circuit of box 14 and provide a voltage which is impinged upon a very rapid timing circuit included in box 15. This rapid timing circuit provides a pulse which drives the counter into the "A-Pedestrian Clearance" position, i.e., a "Flashing Don't Walk" for the cross street. Thereafter the sequence of operation proceeds as indicated in FIG. 3 until such time as the B-extension period is reached. At this point, the timing circuits are responsive to an additional element, the additional element being the number of vehicles passing the intersection. Each vehicle provides for an impulse which only in this condition resets the internal timing circuit to zero, i.e., restarts the interval timing for the extension period. Thus, theoretically the counter would never move from its "B-extension" position except for the fact that an additional overriding timing element, called the "maximum timer," is provided to terminate the extension period. Thus, the counter is moved out of its B-extension position, possibly by the maximum timer. If there is a requirement that the maximum counter go to its termination, a pulse is provided at point 106 (FIG. 2A) which resets the vehicle memory circuitry so that in the event there are cars awaiting passage at the intersection, the controller has to go through another sequence.

It was noted above that the "and" box 14 will provide a stepping voltage or signal to the timing circuits of box 15 upon reception of a signal from the vehicle detector 10 or the pedestrian pushbutton 11, provided that other conditions are right. These other conditions are (1) that the counter is in a rest position after having passed through "Green-1 minimum," and (2) a coordination control is properly set. This coordination control correlates the controller to other traffic lights as will be hereinafter more specifically described.

Figure 2A:
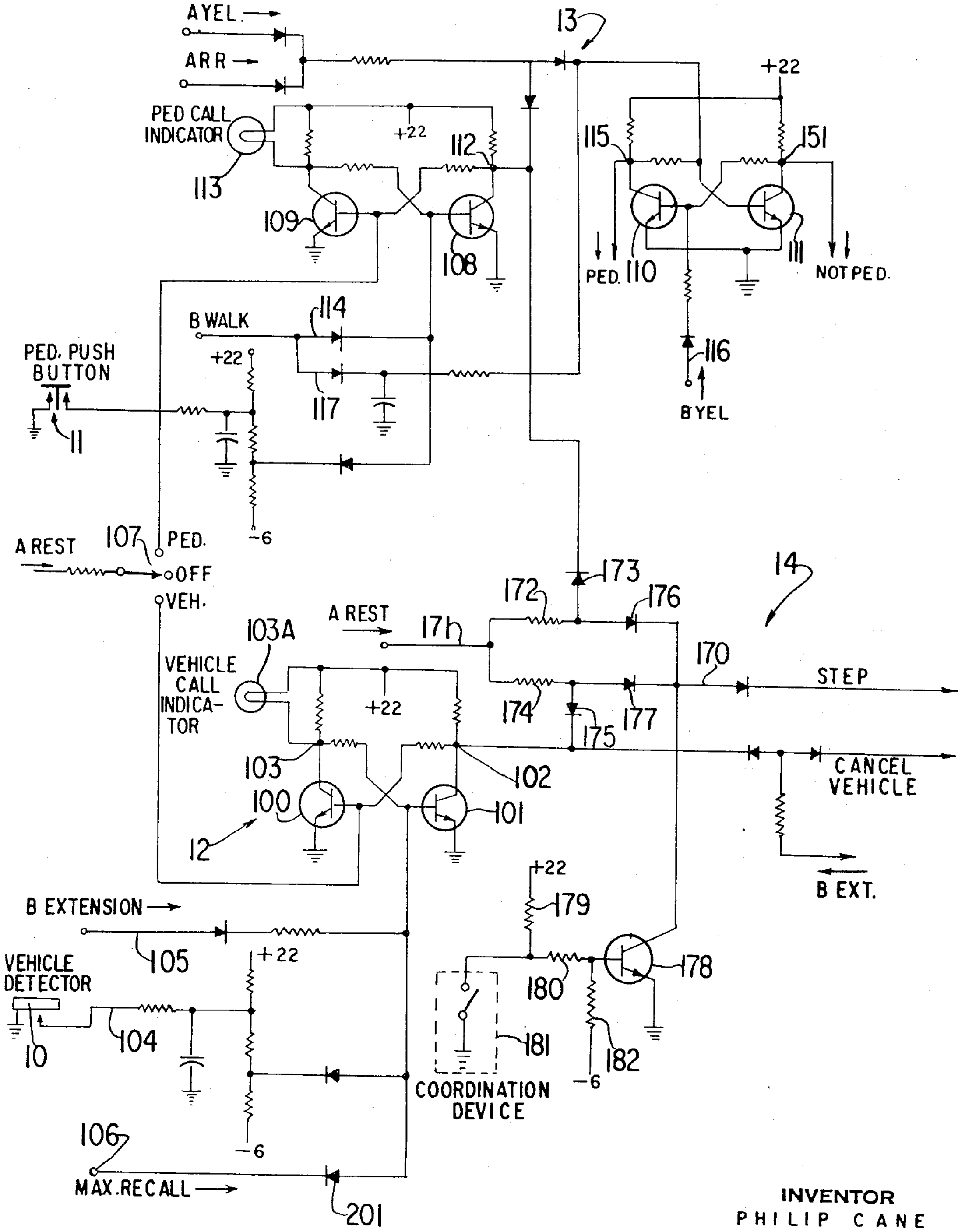
FIGS. 2A, 2B, 2C and 2D show a specific circuit arrangement for one form of the invention.

Describing now the vehicle detector and related memory circuits, reference is made to FIG. 2A. When the vehicle detector 10 is operated by passage of a vehicle, it combines with the vehicle memory (box 12) which consists of a two-stage bistable multi-vibrator transistor circuit having transistors 100 and 101, one stage of which will be on while the other is off. An operation of this transistor circuit will cause a flip-flop reversal of the initial conditions. Under normal conditions, transistor 101 is conducting so that the output at point 102 will be at ground zero or ground potential. Transistor 100 will be non-conducting and the voltage at point 103 will be at supply potential, for example, +22 volts, thus shunting the vehicle call indicator 103A. The operation of the vehicle detector 10 grounds the input point for the circuit through lead 104 and causes transistor 101 to become non-conducting, thus raising the point 102 to supply voltage logic 1 condition. Transistor 100 becomes conductive, lowers the voltage at 103, and lights indicator 103A. During the extension interval, a voltage is introduced at point or lead 105 so that transistor 101 will again be caused to be conducting so as to lower point 102 to zero. An additional method of setting transistor 101 to its non-conducting condition is through the maximum recall circuit which will be described at a later point. The maximum recall pulse is applied to point 106. A vehicle recall switch 107 provides for operation of transistor 100 and consequent placing of transistor 101 in a non-conducting condition under manual control, during the "A" rest position.

Describing now the pedestrian memory circuit,box 13, it will be seen that this circuit consists essentially of two flip-flop bistable multi-vibrator circuits, one having transistors 108 and 109, and the other transistors 110 and 111. The second circuit can be denoted as the "ped memory auxiliary circuit." Transistor 108 is normally conducting and 109 non-conducting. The operation of the pedestrian pushbutton 11 sets transistor 108 to a non-conducting condition to provide an output at point 112. Transistor 109 is connected to the "ped call" indicator 113 which will provide a visual indication of the reception of a pedestrian actuation. During the B-walk period, transistor 108 will be returned to its conducting condition via line 114. In addition to operation from the pedestrian pushbutton, the transistors 108 and 109 of the first memory circuit may be operated by a manually operated recall switch 107. The recall switch 107 can be in the pedestrian recall position, off position, or a vehicle recall position. In either of the recall positions, a signal is introduced during the A-rest interval period which will provide a result equivalent to pushing the pedestrian button or vehicle detector actuation and causes recycling of the controller without need of vehicle or pedestrian actuation.

The auxiliary memory circuit including transistors 110 (normally conducting) and 111 (normally non-conducting) is set to provide a pedestrian output signal at point 115 when the following conditions exist: (1) a pedestrian call at point 112, and (2) the controller timer device in either A-Yellow or A-All Red condition. As a result, a pedestrian output signal will be available at point 115. The pedestrian signal output of flip-flop 110, 111 will be reset to zero, for example, by means of the B-Yellow signal introduced at point 116. When there is a pedestrian output signal and the signal circuits are in a B-Walk condition, and there is a momentary interruption of power which might cause transistors 110 and 111 to revert to the non-ped-output condition, the B-Walk signal introduced at point 117 will tend to hold transistor 111 at its conducting condition so as to hold transistor 110 in a non-conducting output condition, or logic 1 condition. This will allow for a continuity of the Walk signal condition. If there is no pedestrian call during the A-Yellow and A-Red periods, transistor 111 will remain conducting and provide a "Not Ped" signal at point 151 for a purpose hereinafter explained.

Describing the "and" circuit of box 14, reference is again made to FIG. 2A in which the purpose of the "and" circuit is to remove the counter 16 from the A-Rest position. The counter 16 is removed from A-Rest position by means of a step voltage which is produced at point 170. This output voltage may be produced by means of a signal originating at the A-Rest 143 (FIG. 2C) output which is transferred to the point 171 of FIG. 2A. With transistor 108 conducting, however, the voltage available at 171 is passed through resistor 172, diode 173 and transistor 108 to the ground. Thus, no step voltage can result. Similarly, if there is no vehicle call, then the voltage at 171 is transferred through resistor 174, diode 175 and transistor 101 to ground. Thus, no voltage can result in this case at 170. However, if either or both transistors 108 and 101 are non-conducting, then a signal will go from point 171 through resistor 172 and diode 176 to point 170, or 171, resistor 174, diode 177 to point 170. In either of these events, the voltage will be transferred to the point 178A of the timing circuitry of FIG. 2B. The action at this point of FIG. 2B is to cooperate with capacitor 154A to drive unijunction transistor 155 into conduction, thus providing a pulse at point 156 which is then transferred through diode 157, to the count pulse output 118 to drive the counter 16 of FIG. 2C.

In the foregoing discussion of the removal of the counter from the A-Rest position, no note was made of the coordination circuit, the coordination transistor being 178 of FIG. 2A. With this circuit in use, the transistor 178 is normally driven into conduction by means of supply voltage through resistors 179 and 180, thereby connecting point 170 to ground and preventing the stepping or removal of the counter 16 from the A-Rest position except at predetermined periods of time coordinated to the operation of other controllers, such as is used in New York City, for example. A coordination device which is essentially a switching element, as shown schematically at 181, operates the circuit. When this device is closed, resistor 179 is grounded and resistor 182, acting from the negative source, causes transistor 178 to be cut off. When this occurs, the point 170 is no longer grounded and therefore the step voltage can pass on to the counter as outlined above.

Figure 2B:
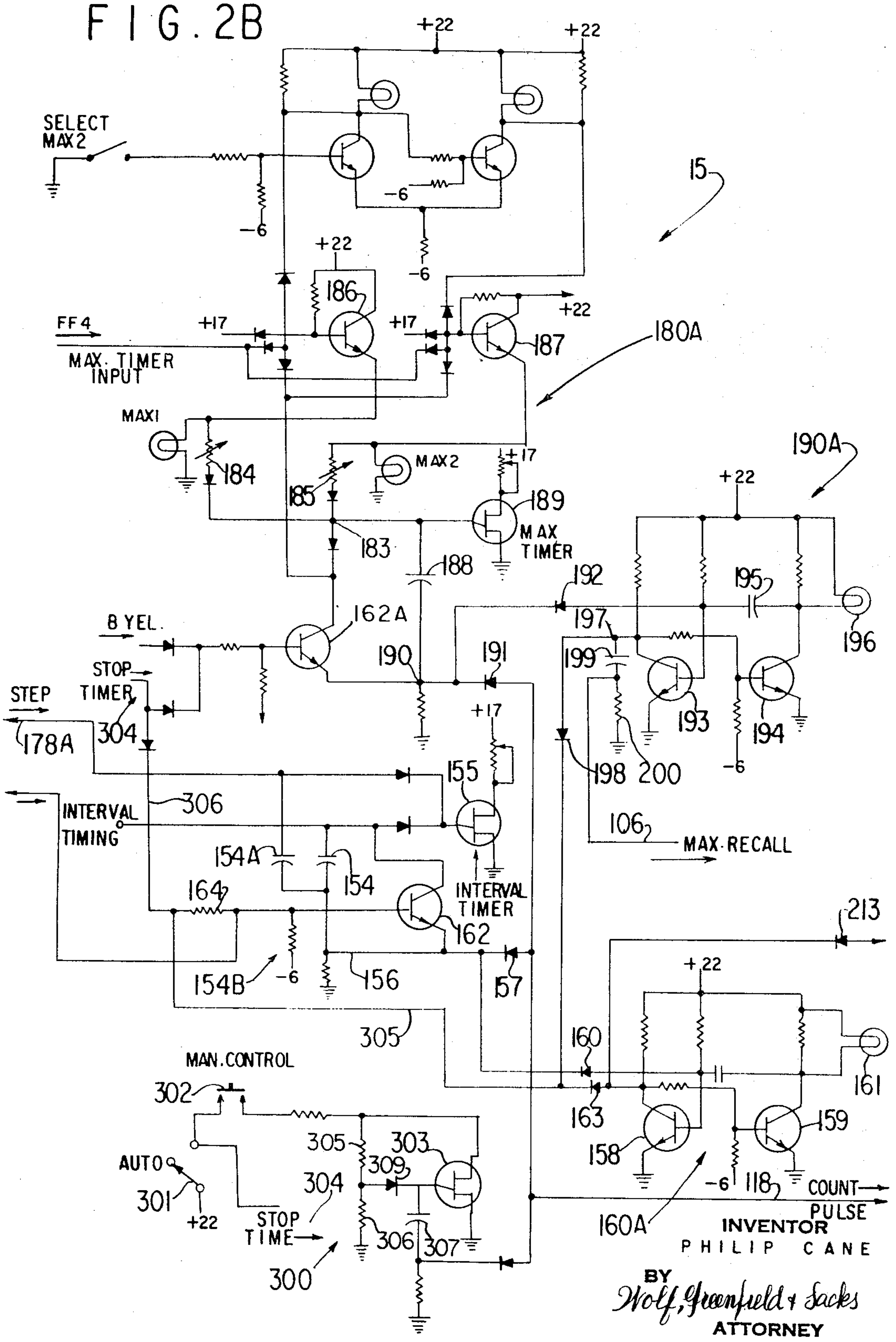
Figure 2C:
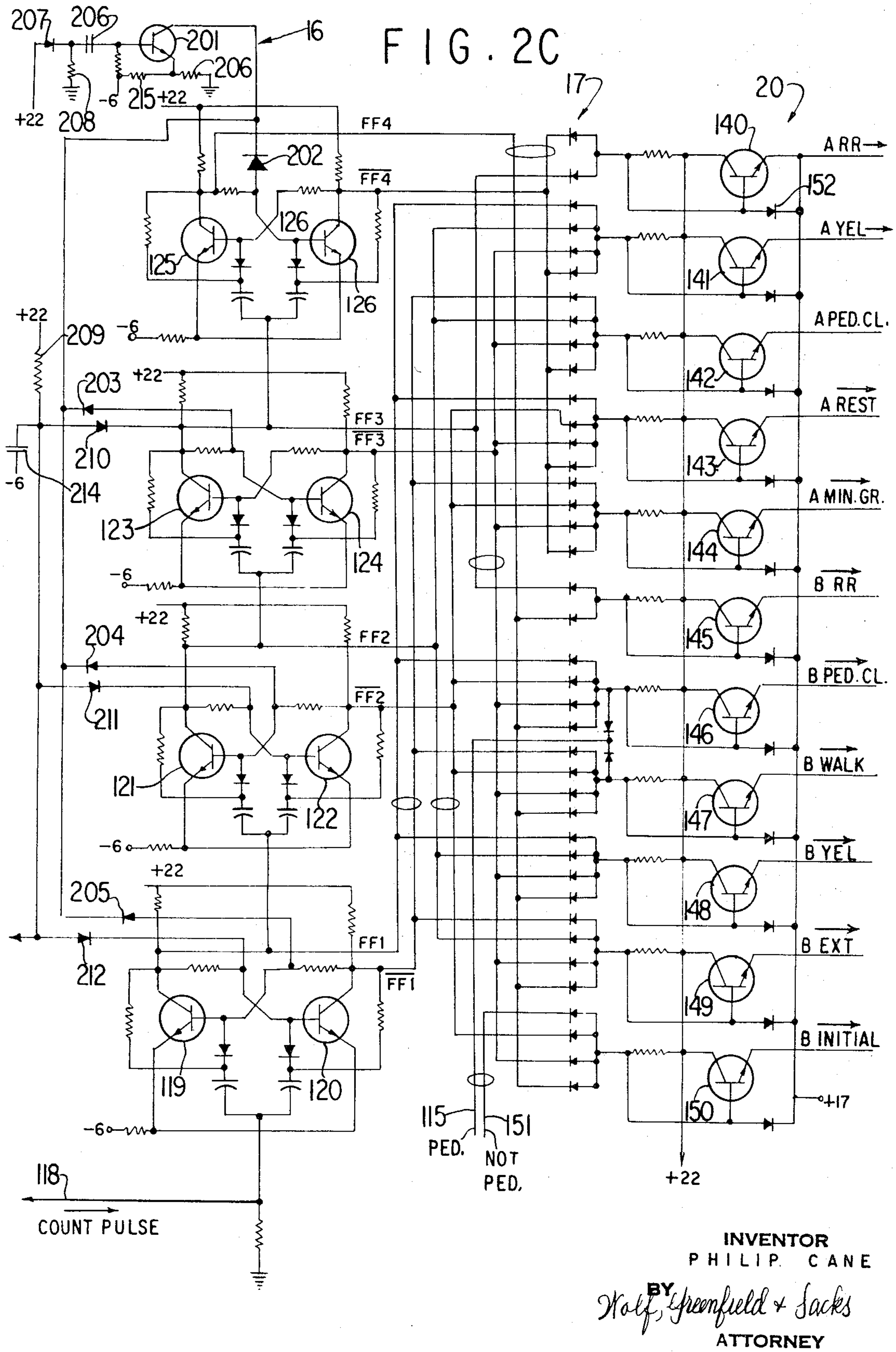

The timing circuits 15 are shown on FIG. 2B and are essentially RC circuits in which the value of the series resistance is changed by variable potentiometers, box 19, to effect timing variation. It will be seen from FIG. 2D that a different timing is obtainable for each of the intervals A-minimum, A-rest, A-pedestrian clearance, etc. The charging source applied to each of these stages has essentially the same value and, in addition, is clamped to a regulated voltage so as to insure that they are essentially the same, e.g., by means of diode 152 (FIG. 2C). These voltages are fed to the variable timing resistors, e.g., 153, of FIG. 2D. Each of the variable timing resistors or potentiometers may be set at a desired value to control the timing for the selected interval. However, it will be noted that only one interval voltage is available at a time and therefore only one voltage at a time is fed to the interval timing circuit 154B (FIG. 2B) and used to charge the interval timing capacitor 154 (FIG. 2B). When the interval timing capacitor 154 reaches a critical voltage, the unijunction transistor 155 (FIG. 2B) will fire, causing a negative pulse at point 156 to be produced which can be termed the "count pulse." The count pulse is transferred to point 118 (FIGS. 2B and 2C) through diode 157 (FIG. 2B) so as to cause the counter to advance one stage. The unijunction transistor 155 will virtually totally discharge capacitor 154. However, to assure complete discharge of capacitor 154 for the next timing interval, the pulse at 156 applied through diode 160 is used to operate a monostable multivibrator 160A. The output of the monostable multivibrator, consisting of transistors 158 and 159, is used to operate momentarily an interval timing light 161 so that the termination of an interval is visually indicated. In addition, the output of transistor 158 fed through diode 163 and resistor 164 is used to drive transistor 162 into conduction to discharge the interval timing capacitor 154 to zero.

The interval timer, in addition to operating from 154, may also be caused to operate from 154A as aforesaid. The value of 154A is purposely chosen as being quite small so that a rapid step of very short time may be obtained. The reason for this is to take the counter out of the Rest position as heretofore described.

In addition to the interval timing and step circuits heretofore described, the timing circuitry of box 15 (FIG. 1) also includes a maximum interval timing circuit 180A which is fed from the FF4 terminal of the counter during the initial and extension period, or the Walk, Walk-clearance, and extension intervals of the controller by gating of transistors 186 and 187 (FIG. 2B). The current from transistors 186 or 187 feeds either through potentiometers 184 or 185 (positioned in box 19) depending upon whether other circuitry requires the output to be either in the maximum 1 or the maximum 2 condition. The voltage available through the potentiometers 184 or 185 is imposed at point 183 to charge capacitor 188. When and if capacitor 188 is charged to the trigger voltage of the unijunction transistor 189, the unijunction transistor will conduct and discharge capacitor 188 to produce a negative-going pulse at point 190. This pulse is transferred through diode 191 to the count pulse lead 118 and through diode 192 to operate the monostable multivibrator comprised of transistors 193 and 194. When the negative pulse originating at 190 is transferred to the count pulse line 118, it will drive the counter into a succeeding position. At the same time, through 192 it will cause transistor 193 to become momentarily non-conducting for a period fixed by capacitor 195 and associated components. Simultaneously, the indicator lamp 196 will show that multivibrator 193, 194 is changing conditions.

A positive-going pulse made available at point 197 will be transferred through diode 198 and line 305 to resistor 164 and thence to the interval timer reset transistor 162 in order to cause any residual voltage that may be present on capacitor 154 to return to zero so that subsequent timing of 154 will not be in error. In like manner, capacitor 188 is reset to zero via line 306 and resistor 164A. Also, simultaneously with the operation of this multivibrator, a pulse is produced by means of differentiating circuits 199 and 200 and applied to maximum recall point 106. Point 106 is also shown on FIG. 2A, and it will be seen that diode 201 on FIG. 2A is so placed that the negative-going pulse will turn off transistor 101 to register a call in the circuit 100, 101. It will be seen, too, that the maximum recall takes place on the trailing edge of the pulse, that is to say, when transistor 193 returns to its usual conducting condition. This provides a sufficient delay to permit the counter to get to the next position, which removes the counter from the B-extension condition. Thus, there will be no voltage at point 105 and the negative pulse available at 106 will be effective in maintaining the set condition of transistor 100 for recycling the controller at its next A-Rest position.

The counter or logic circuit of box 16 (FIG. 1) can include a four-stage binary counter which would ordinarily be capable of sixteen counts. It comprises circuitry as shown on FIG. 2C and consists of transistors 119 and 120 as the first stage; 121 and 122 as the second stage; 123 and 124 as the third stage; and 125 and 126 as the fourth stage. For convenience, the "true" output of the first stage is called FF1 and the "false" output is called $\overline{FF1}$. Similar notation has been adopted for stages 2, 3 and 4. It will be understood that when FF1 is at 1, $\overline{FF1}$ is at zero; and when $\overline{FF1}$ is at 1, FF1 is at zero. The counter, while it is a four-stage counter, has contained within it a feedback circuit such that when stage 3 reaches a 1 output, it automatically drives stages 1 and 2 to a 1 output as well. The sequence of the counter and code gating is indicated essentially in FIG. 3 where for the first four counter positions the output results in the usual binary count. The counter is self-driven from its usual fifth count to the eighth count. A similar result is provided to drive the counter from the usual twelfth position directly to the sixteenth position of the binary count.

The outputs of the counters are combined in "and" circuits to form code gates (Box 17 of FIG. 1) which control the emitter follower transistors 140-150, inclusive (Box 20 of FIG. 1). Thus, transistor 144 will provide an output when the counter is in condition where logic 1 is obtained at $\overline{FF1}$, $\overline{FF2}$, $\overline{FF3}$ and $\overline{FF4}$. Thus, the four logic 1 s from the last mentioned outputs of the counter define the A-minimum position. Other positions, such as A-red, A-ped clearance, A-yellow, are similarly defined by a total of four outputs, one from each counter stage. The A-All Red condition is merely defined by two gate outputs, namely, FF3 as 1 and $\overline{FF4}$ as 1, since no position exists that does include FF3 and $\overline{FF4}$ which define positions of the controller, other than All Red.

The B Initial position is produced twice inasmuch as the first flip-flop is not represented in the code gate to transistor 150. Therefore, the B Initial will have an output through two successive positions of the counter. In addition, however, the B Initial is also defined by the output from the pedestrian auxiliary memory circuit at point 151 (FIGS. 2A and 2C). With a "not Ped" output, the controller will go into the B Initial I position. If there were, however, a "Ped output" (point 115, FIGS. 2A and 2C) then the circuitry will drive transistor 147 to provide a B-Walk output. This is done as shown in FIG. 2C by means of $\overline{FF1}$, $\overline{FF2}$, $\overline{FF3}$ and FF4 and the Ped auxiliary memory output 115. In like manner, B-Ped clearance output of transistor 146 would be substituted for B Initial II by means of inputs 115, FF1, FF2, FF3 and FF4.

B-Extension and B-Yellow are provided by transistors 148 and 149, respectively, under the counter conditions as listed in FIG. 3. B-All Red transistor 145 is similar to A-All Red transistor 140 in that it only requires two code gatings due to the non-usage of the intervening positions between 12 and 16. It should be apparent that the foregoing method provides for dependable operation in the event the feedback loop that sets FF1 and FF2 at 1 whenever FF3 is set at 1 should become inoperative, because then the All-Red signal will simply be repeated three times without causing other malfunction of the controller or dangerous signal conditions to be set up.

Figure 2D:
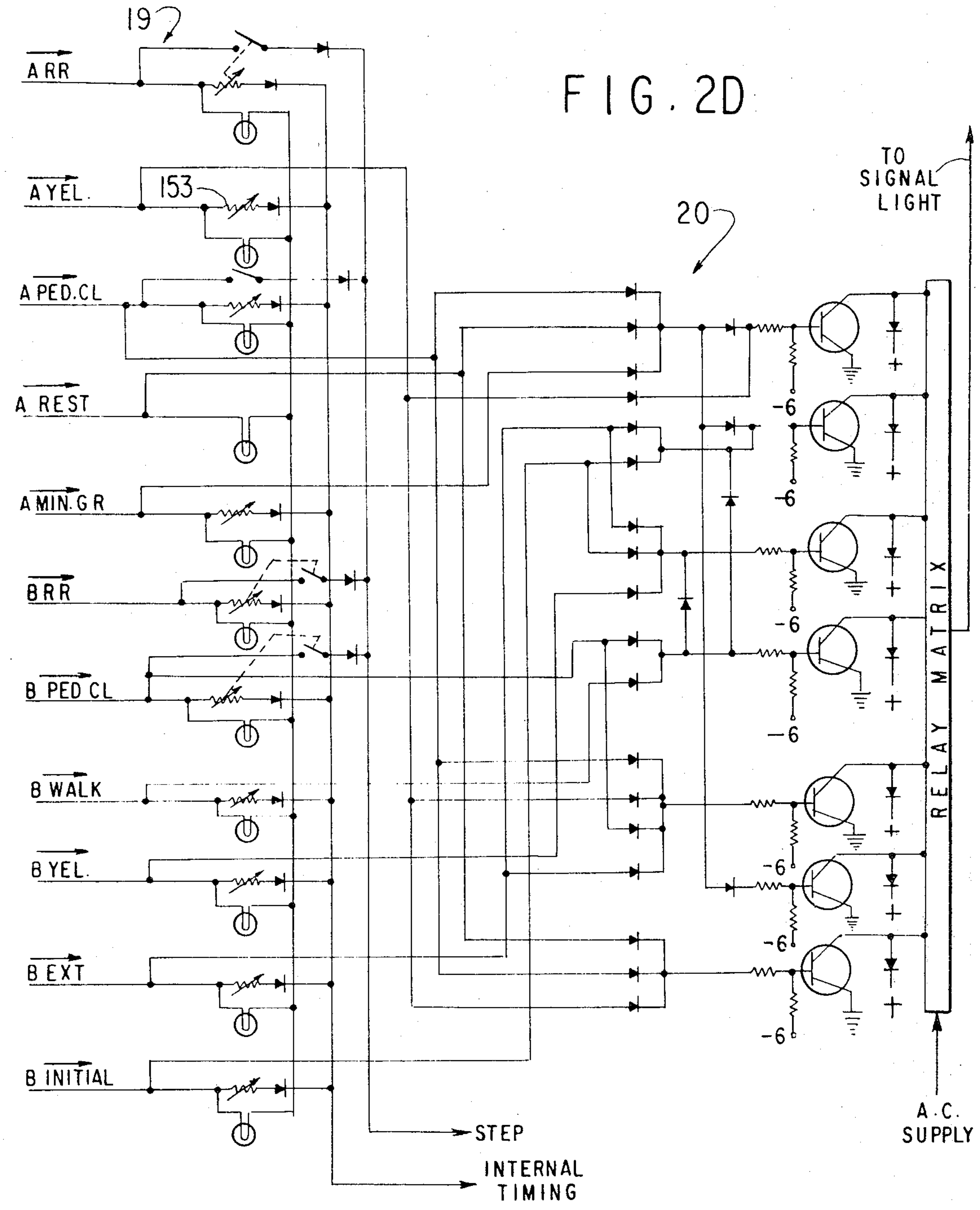

The circuits for the solkd state relays making up the relay matrix of Box 20 (FIG. 1) are also shown on FIG. 2D. These relays provide for an interconnection of the signal lights to prevent conflicting signal indications such as may endanger the traffic situation. The combination of these relays could provide for any signal sequence condition desired, with the exception, of course, of the dual Green which is eliminated by means of the interconnections of the relay. The relay matrices may be made up in any way, but in any event, will depend upon the outputs of the gated emitter followers.

If the controller were turned on at random, it would assume a random position. This is not consistent with needs for traffic control signals since the person first setting the controller into operation must be aware of the present traffic flow. Therefore, it can be assumed that the best position to place the controller into condition would be when the signals show amber or yellow to the main street and red to the cross street. This corresponds in essence to the counter position shown as 1100 on FIG. 3. The method of doing this is to preset the counter at turn-on. Referring to FIG. 2C, the transistor 201 will be normally shut off by means of the negative voltage source and resistors 215 and 216. However, at turn-on, that is, when the signal equipment is first turned on, the positive voltage applied through diode 207 and capacitor 206 is sufficient to drive transistor 201 into conduction for a short while. This conducting condition is operable through diodes 202, 203, 204 and 205 to turn off transistors 119, 121, 124 and 126. This turn-on signal is removed almost immediately since capacitor 206 will be charged up and will no longer conduct. Under this circumstance, the controller, while started in the Yellow-1 condition, will be released immediately so that it can go through its normal sequence.

The FIG. 3 sequence indicates that there are ten discrete steps or intervals in the controller sequence. The counter illustrated in FIG. 2C is a binary counter which has sixteen fundamental conditions. As above set forth, means are provided to change the sixteen-position counter into a ten-position counter. This is done by the following method. When position No. 5 is reached, the situation is such that the code will be 0010. Under these circumstances, resistor 209 (FIG. 2C) is gated by diode 210 since this is the first time in the sequence that this third stage reaches the 1 position. When this happens, a signal is sent out via diodes 211 and 212 to change the condition of the two stages so that they, too, are in the 1 position. This means that from position No. 5 the circuitry is immediately driven into position No. 8. Similarly, when the circuit reaches position No. 13, it is immediately driven into position No. 16. Diode 213 (FIG. 2B) is used to gate this control mechanism from the multivibrator 158, 159 so that the main gating can take place only during a change in condition. Also, capacitor 214 is included to delay the application of this change until such time as the counter has had sufficient time to reach a static normal condition and, therefore, will be able to respond accurately and dependably.

Under some circumstances, it is useful for traffic control personnel to be able to operate the equipment manually, without regard to the preset timing controls. Operation of the switch 301 provides a voltage to the stop time circuits at 304, to cause transistors 162 and 162A to be continually conductive, thus preventing timing capacitors 154 and 154A from reaching the discharge potential needed to trigger 155 or 189. Operation of the manual control 302 charges capacitor 307 to a value limited by the voltage divider 305, 306; which value is insufficient to cause 303 to trigger. When 302 is released, the voltage at the base of 303 is reduced to zero and 307 is enabled to discharge, providing a pulse at 118, which drives the counter one position. The circuit described provides a clean pulse for each opening of the manual control 302.

While an exemplary embodiment of the invention has been illustrated and described, it will be apparent that alterations, changes and modifications may be made in the specific circuits and/or the components thereof without departing from the spirit of the invention, and it is intended to be limited only by the scope of the appended claims.

I claim:

1. In a traffic signal controller apparatus comprising,
a binary counter having a plurality of bistable stages and at least one input count line and capable of assuming a number of different states each representative of a predetermined traffic flow condition,
and manually operated means for generating a single count pulse at a time and thereby selectively advancing the count in said binary counter to thereby establish the next traffic flow condition,
said manually operated means comprising,
a switch means having an actuated and non-actuated state,
power supply means,
a uni-junction transistor coupled to said switch means and said power supply means and having a control electrode,
and a capacitor coupled to said control electrode,
said capacitor adapted to be in a charged condition insufficient to render said uni-junction transistor conductive when said switch means is in its actuated state and adapted to be in a discharge condition rendering said uni-junction transistor conductive when said switch means changes to its non-actuated state thereby generating said count pulse via said capacitor.

2. Apparatus as set forth in claim 1 wherein said switch means is a normally open push button switch.

3. In a traffic signal controller apparatus comprising,
a binary counter having a plurality of bistable stages,
means for selectively advancing the count in said binary counter to establish a sequence of different states of said binary counter, each said state representative of a predetermined traffic flow condition and including an initial state,
means for time demarcating the time duration of each traffic flow condition, said means for selectively advancing being responsive to said means for time demarcating,
said means for selectively advancing including,
means for causing said binary counter, in a cycle, to step through a first group of n counts corresponding to a first phase of traffic flow,
means for causing said binary counter to skip m counts in the same cycle,
and means for causing said binary counter to step through a second group of n counts in the same cycle corresponding to a second phase of traffic flow,
wherein said last count of both said first and second group of n counts causes said controller to assume a condition wherein stop signals are displayed to traffic approaching in both phases,
said means for causing said counter to skip comprising decoding means responsive to a predetermined binary counter position for skipping said m counts.

4. Apparatus as set forth in claim 1 comprising a resistive voltage divider coupled intermediate said switch means and capacitor for establishing an initial voltage on said capacitor when said switch means is actuated, which initial voltage is less than the firing voltage of said uni-junction transistor.

5. In a traffic signal controller apparatus comprising,
a binary counter having a plurality of bistable stages,
means for selectively advancing the count in said binary counter to establish a sequence of different states of said binary counter, each said state representative of a predetermined traffic flow condition and including an initial state,
means for time demarcating the time duration of each traffic flow condition, said means for selectively advancing being responsive to said means for time demarcating,
said means for selectively advancing including,
means for causing said binary counter, in a cycle, to step through a first group of n counts corresponding to a first phase of traffic flow,
means for causing said binary counter to skip $m$ counts in the same cycle, means for causing said binary counter to step through a second group of $n$ counts in the same cycle corresponding to a second phase of traffic flow, said last count of both said first and second group of $n$ counts causing said controller to assume a condition wherein stop signals are displayed to traffice approaching in both phases, and means for decoding the count in said binary counter, each said count being representative of a predetermined traffic flow condition, said decoding means including a plurality of decoder gates wherein the gates for decoding said last count of both said first and second group of $n$ counts each have fewer necessary connections from said binary counter than the remaining gates of said plurality of decoder gates.

6. In a traffic signal controller for establishing a predetermined number of traffic flow conditions apparatus comprising:

a binary counter having a group of cascaded stages and capable of assuming a plurality of counts greater than said pre-determined number, each of said counts corresponding to a traffic flow condition, said counter being advanced from one count to another once for each input signal coupled to an input terminal of said counter, manually operated means for generating an input signal, and means for coupling said input signal to said input terminal of said counter for advancing the count thereof to establish the next traffic flow condition, said manually operated means comprising, a switch having an actuated state and a non-actuated state, power supply means, a three terminal semiconductor device coupled by way of said switch to said power supply means, one of said terminals being a control electrode and another coupled to said switch, and a capacitor coupled to said control electrode, said capacitor adapted to be in a charged condition insufficient to render said device conductive when said switch is in its actuated state and adapted to be in a discharge condition rendering said device conductive when said switch changes to its non-actuated state thereby generating said input signal via said capacitor.

* * * * *